United States Patent [19]
Kendall et al.

[11] Patent Number: 6,032,149
[45] Date of Patent: *Feb. 29, 2000

[54] VEHICLE ELECTRICAL SCHEMATIC MANAGEMENT SYSTEM

[75] Inventors: Jeffrey M. Kendall, Southfield; Donald H. Locker, Chelsea; Stephen P. Maynard, Waterford; Deepa Soni, Southfield, all of Mich.

[73] Assignee: Chrysler Corporation, Auburn Hills, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/842,100

[22] Filed: Apr. 28, 1997

[51] Int. Cl.[7] ................................................ G06F 17/30
[52] U.S. Cl. .................... 707/102; 707/104; 395/500.02; 395/500.34
[58] Field of Search ..................... 707/104, 102; 364/488; 395/424, 500.29, 500.02, 500.34

[56] References Cited

U.S. PATENT DOCUMENTS

| | | | |
|---|---|---|---|
| 5,305,219 | 4/1994 | Ishibashi et al. | 364/424.04 |
| 5,551,028 | 8/1996 | Voll et al. | 395/600 |
| 5,583,767 | 12/1996 | Ehlig et al. | 364/423.01 |
| 5,586,275 | 12/1996 | Ehlig et al. | 395/564 |
| 5,608,874 | 3/1997 | Ogawa et al. | 395/200.15 |
| 5,623,418 | 4/1997 | Rostoker et al. | 364/489 |
| 5,650,931 | 7/1997 | Nii | 364/424.026 |
| 5,666,288 | 9/1997 | Jones et al. | 364/490 |
| 5,737,711 | 4/1998 | Abe | 701/29 |
| 5,886,898 | 3/1999 | Choudhury et al. | 364/478.06 |
| 5,912,810 | 6/1999 | Kucukcakar et al. | 395/500.02 |

*Primary Examiner*—Paul R. Lintz
*Assistant Examiner*—Jean Bolte Fleurantin
*Attorney, Agent, or Firm*—Roland A. Fuller, III

[57] ABSTRACT

A method for managing the production of vehicle electrical schematics includes entering into a computer manual changes to preexisting schematics and to textual connector pages that pertain to the schematics. A computer program then reconciles the textual pages with the schematics, combines them, and then outputs a new version of the schematics with connector pages.

11 Claims, 3 Drawing Sheets

6,032,149

VEHICLE ELECTRICAL SCHEMATIC MANAGEMENT SYSTEM

FIELD OF THE INVENTION

The present invention relates generally to vehicle design methods, and more particularly to methods for managing the generation and production of electrical schematic diagrams for vehicles.

BACKGROUND OF THE INVENTION

Vehicle models typically change in design from year to year. Each time a design is changed, it might be necessary to modify the electrical system of the vehicle. Whenever the electrical system requires modification, the electrical system schematic diagrams, colloquially referred to as the "schematics", as well as accompanying and explanatory text, colloquially referred to as "device transmittals" must also be changed. It is only with reference to the schematics that the vehicle electrical system can be understood and implemented in production.

It happens that in modern vehicle design, a team of engineers is ordinarily responsible for designing the electrical system of a particular vehicle model. Traditionally, in designing vehicles, including the electrical systems of vehicles, the design documents such as electrical schematics and accompanying databases are manually generated. With the advent of computer aided design, however, computers are used for much of the design process to generate the appropriate electrical schematics and accompanying databases. Nevertheless, some design is still undertaken using manually generated documents.

In any case, while computer aided design is a boon to design engineers, coordinating the design efforts can be complicated. It is important that changes made to a design by various members of the engineering team be properly managed, so that the efforts of the team can be coordinated. For example, when a master schematic is electronically stored, care must be taken that modifications to the master schematic be managed to avoid the generation of conflicting modifications to the master by different engineers. Otherwise, it can be difficult, if not impossible, to know what the most current approved design is. The management problem is further complicated under circumstances wherein a vehicle's electrical schematics are to be derived from a set of preexisting schematics, e.g., for an older, existing model, using a combination of manual techniques and computer aided design.

The present invention recognizes the above problems. In recognition of the above problems, the present invention further recognizes a need to provide a vehicle schematic management system that addresses the above-noted problems. Accordingly, it is an object of the present invention to provide a method for managing the design of a vehicle's electrical system. A further object of the present invention is to provide a vehicle schematic diagram management system for design systems that use a combination of manual design techniques and computer-aided design techniques. Still another object of the present invention is to provide a vehicle schematic diagram management system that is easy to use and cost-effective.

SUMMARY OF THE INVENTION

The invention is one or more general purpose computers that execute one or more computer programs according to the inventive steps herein to manage the production of vehicle electrical schematic diagrams, hereinafter referred to as "schematics", "schematic sheets", or "sheets". The invention can also be embodied as an article of manufacture—a machine component—that is used by a digital processing apparatus and which tangibly embodies a program of instructions that are executable by the digital processing apparatus to manage the generation of vehicle schematics. This invention is realized in a critical machine component that causes a digital processing apparatus to perform the inventive method steps herein.

In accordance with the present invention, the method steps include accessing an electronic graphics database of electrical schematics and accessing an electronic text database of data pertaining to the schematics. Further, the method steps include determining whether the electronic text database includes information associated with at least one connector symbol in at least one of the schematics. Moreover, the method steps include generating an output that represents each of the schematics.

In a preferred embodiment, the method includes four principal routines. In a first routine, a software routine referred to as "GCP.VS" generates "connector pages" which are appended to the schematic sheets to convey "device transmittal information". In a second routine, a software routine referred to as "PUBLISH.VS" generates changes and index pages and arranges the pages for easy binding and publication. In a third routine, a method is provided for allowing users to view and to electronically edit the database from which "connector pages" are generated as well as view (but not edit) schematic sheets online. In a fourth routine, a software routine referred to as "CNUMS.PL" extracts a database from "connector pages", whether generated by the above methods or manually entered. The efficacy (stability) of these routines can be understood by passing data in the first routine and comparing it to data returned from the fourth routine in the absence of manual edits.

With particular regard to the first routine, at least one electrical connector symbol is located on at least one of the schematic sheets, with the number of times the symbol is repeated on the schematic being determined. The symbol is then associated with data from the device transmittal database. Also, the method determines whether the text database contains default data for assigning such default data to the symbol, when the text database does not contain data on the particular symbol. Per the present invention, the default data is for only a single repetition of the symbol. A computer-implemented method that undertakes the above steps, as well as a computer program device incorporating computer readable code means for executing the above steps, are also disclosed.

With further regard to the second routine, a method for publishing a schematic book is provided, with the schematic book including a change log, index pages, cover pages, and connector pages. These steps are preferably accomplished by respective computer sub-routines in the overall program "Publish.vs". A change log exists in the working directory containing the schematic sheets and is created by the "Change.vs" script which sends mail to a plain text file with a time and date stamp and the user's change notes. "Changes.vs" reads this file and produces an intermediate file which may be included on special automatically generated schematic sheets called "change pages". "Indexer.vs" reads the entire schematic including schematic sheets and connector pages and creates an index which lists electrical symbols and connector symbols and which page they appear on. The result of indexer.vs is placed in an intermediate file which is used by "makedwg.vs" to automatically generate schematic sheets based on the outputs of changes.vs and indexer.vs.

In the third routine, the production of vehicle electrical schematics is managed by editing vehicle schematics to generate edited schematics, and editing a database containing data associated with the schematics to generate an edited database. Further, the third routine includes a method for establishing an intermediate electronic graphics database based on the edited schematics. Then, the present inventive method contemplates establishing an intermediate electronic text database based on the edited database. Next, the method combines the electronic databases to generate a set of updated schematics.

With particular regard to the fourth routine, a computer-implemented method for parsing through the entire schematic and finding the beginning of existing "connector pages" is provided. Specific text and symbols on these pages are recognized, and then an ascii text file is generated in a format that is ready to import into a standard database such as Microsoft Access™.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

The present invention provides a management system for generating electrical schematics for a new vehicle model, along with connector pages, by modifying existing schematics of an older vehicle model and then using a computerized manager to ensure quality of the schematics.

Figure 1:
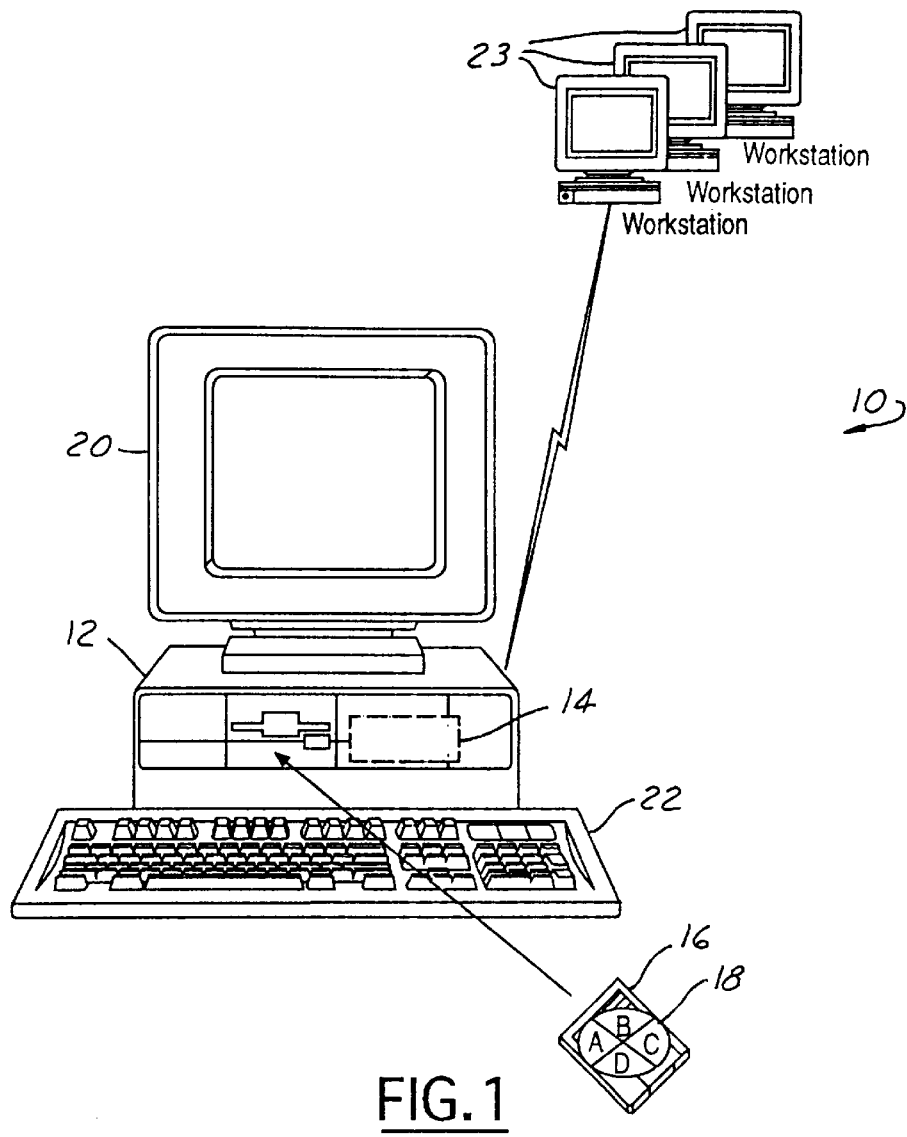
FIG. 1 is a schematic diagram of the schematic management system of the present invention.

Referring initially to FIG. 1, a system for managing vehicle schematic generation is shown, generally designated 10. In the particular architecture shown, the system 10 includes a digital processing apparatus, such as a computer 12. In one intended embodiment, the computer 12 may be a personal computer made by International Business Machines Corp. of Armonk, N.Y., and use an operating system sold under trademarks such as "Windows" or DOS. Or, the computer 12 can be a Sun Microsystems workstation made by Sun Microsystems Corp. of Pleasanton, Calif. As another alternative, the computer 12 may be a Unix computer, or OS/2 computer, or Windows NT computer, or IBM RS/6000 250 workstation, or an IBM laptop computer. The computer 12 can access an associated database using the application program marketed under the trade name "Access" by Microsoft Corp.

As shown, the computer 12 includes a software-implemented schematic manager 14, which may be executed by a processor within the computer 12 as a series of computer-executable instructions. These instructions may reside, for example, in RAM of the computer 12.

Alternatively, the instructions may be contained on a data storage device with a computer readable medium, such as a computer diskette 16 shown in FIG. 1. Or, the instructions may be stored on magnetic tape, conventional hard disk drive, electronic read-only memory, optical storage device, or other appropriate data storage device. In an illustrative embodiment of the invention, the computer-executable instructions may be lines of compiled code, such as C++, or interpreted code, such as Perl™, ViewScript™ from Viewlogic Systems of Marlboro, Mass., or Ample™ from Mentor Graphics of San Jose, Calif. The interface presented to the online database user may be in the hypertext mark-up language (HTML) format.

Certain of the steps in the flow charts below illustrate the structure of such instructions as embodied in a computer program. Those skilled in the art will appreciate that these steps illustrate the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the Figures. The machine component is shown in FIG. 1 as a combination of program code elements A–D in computer readable form that are embodied in a computer-usable data medium 18, on the computer diskette 16. As mentioned above, however, such media can also be found in semiconductor devices, on magnetic tape, and on optical disks.

FIG. 1 shows that the system 10 can include peripheral computer equipment known in the art, including an output device such as a video monitor 20 and an input device such as a computer keyboard 22. Other output devices can be used, such as printers, other computers, and so on. Likewise, input devices other than or in addition to the keyboard 22 can be used, e.g., trackballs, mice, keypads, touch screens, and voice recognition devices. In one implementation of the system 10, the computer 12 is connected to other computers 23 via a computer network such as a local area network (LAN), intranet, or indeed the Internet.

Figure 2:
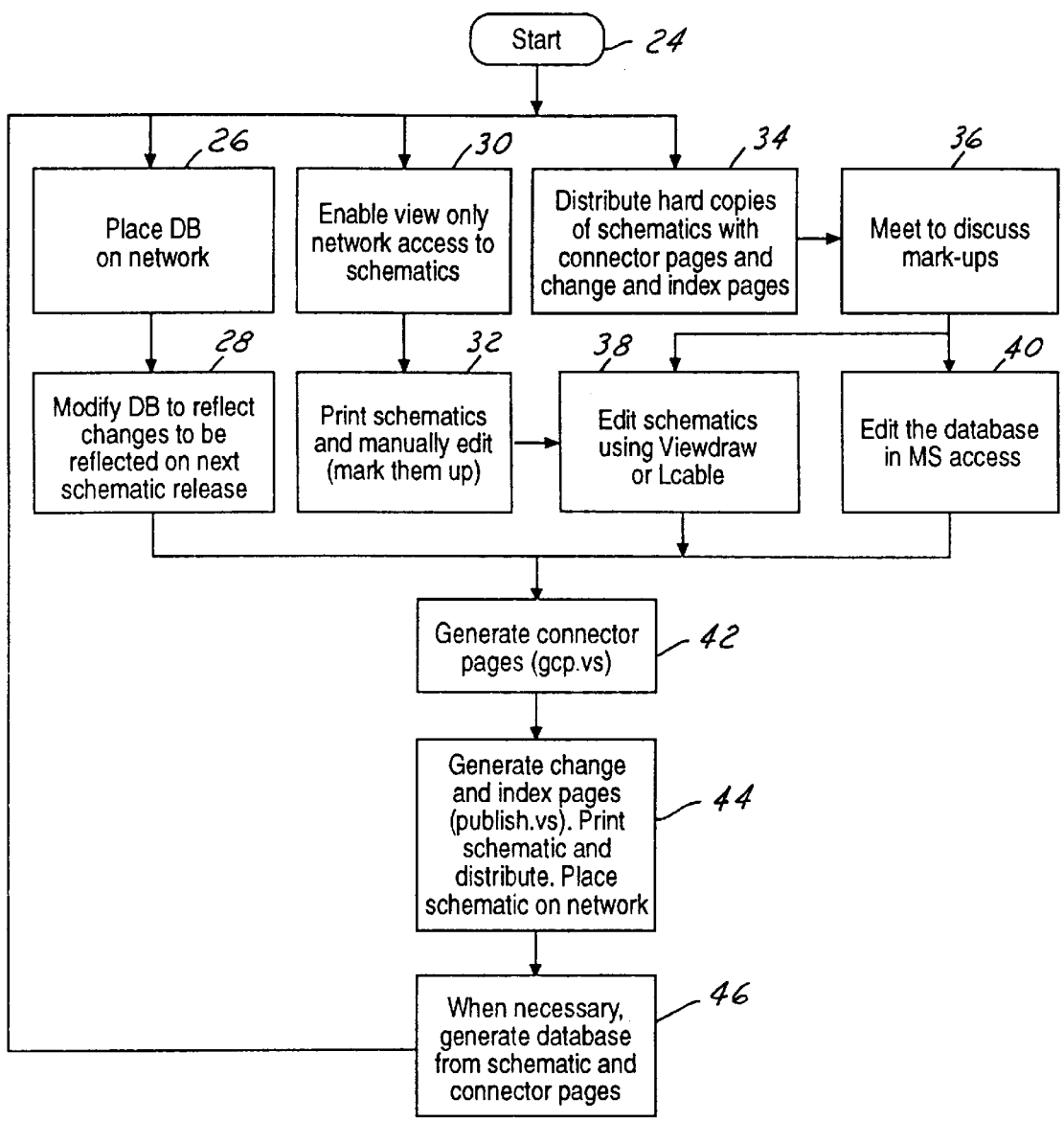
FIG. 2 is a flow chart showing the overall operation of the present system that is preferably executed by a computer.

FIG. 2 shows the overall flow of the management undertaken by the present invention, starting at state 24. Moving to block 26, a database containing information pertaining to the electrical components of a previous vehicle model's schematics (e.g., part symbol, part number, number of times the part appears in the schematics, etc.) is loaded onto the network shown in FIG. 1. Then, at block 28 the database is modified as appropriate for the current vehicle model. In accordance with the present invention, users can edit the database directly online, with each user being restricted to edit only that portion of the database for which he or she is responsible, and the database administrator approves and incorporates the changes for incorporation into the new connector pages.

In parallel with the processes undertaken at blocks 26 and 28, at block 30 users of the computer network are enabled to view, but not to electronically edit, electronically stored schematics that pertain to the previous vehicle model. The users can view the data using a network application such as Netscape™ (bitmap format), or traditional x-terminal feature such as Viewonly Viewdraw or Viewonly Lcable (native vector format). At block 32, the users can print the schematics and manually edit them.

Further in parallel with the process noted above, at block 34 hard copies of the schematics and database pertaining thereto from the previous vehicle model are distributed to the users of the computer network, and at block 36 the users meet to discuss any markups to the hard copies. Moving from block 36 to blocks 38 and 40 in parallel, the hard copies of the schematics are edited at block 38, whereas the hard copies of the associated database are edited at block 40.

Thus, the process above describes the various methods that can be selected by the users to manually edit previous vehicle model schematics and associated databases. The changes are entered into change files in the computer system network by using, e.g., the computer 12 shown in FIG. 1, and then connector pages, i.e., pages of data pertaining to the new vehicle model schematics, are generated at block 42. The process undertaken at block 42 is described in further detail with reference to FIG. 3 below. From block 42, the process moves to block 44 to publish the schematics electronically, on the computer network shown in FIG. 1, and in hard copy. The process undertaken at block 44 is described in further detail below in reference to FIG. 4. At block 46, a database that is formatted in, e.g., Microsoft "Access" is generated from the pages output at block 42.

Figure 3:
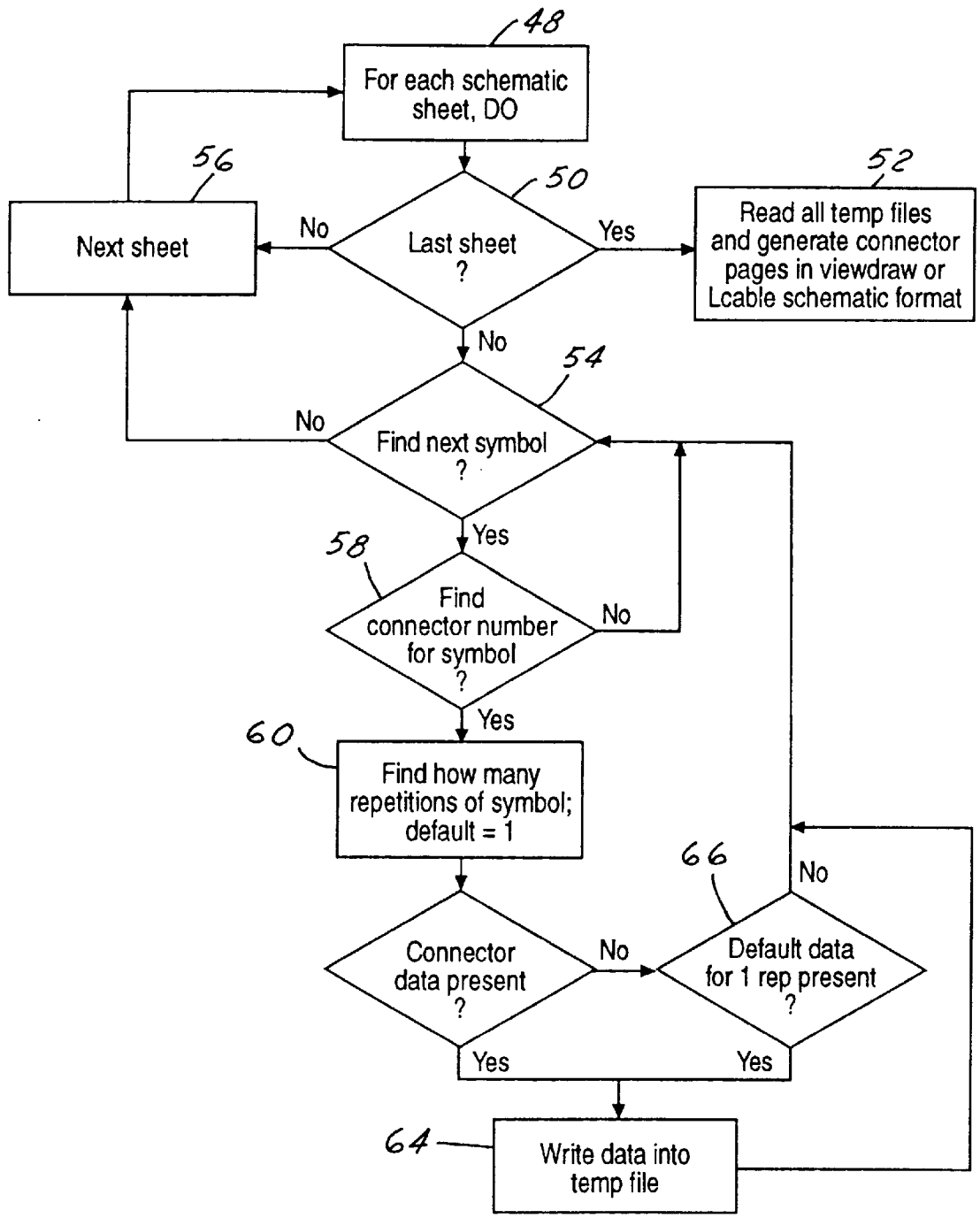
FIG. 3 is a flow chart showing the generation of connector pages.

Now referring to FIG. 3, the computer-implemented process undertaken by the program gcp.vs of the manager 14 (FIG. 1) for generating connector pages is shown. Commencing at block 48, the manager 14 enters a DO loop for each vehicle schematic, referred to herein as a "sheet". Moving to decision diamond 50, it is determined whether the last sheet has been processed. If so, the manager 14 moves to block 52 to read all temporary files, and in response to generate the new connector pages.

On the other hand, if all sheets have not been processed, the manager 14 moves to decision diamond 54 to determine whether a next symbol on the sheet in process can be found. If not (meaning that the current sheet has been completely processed), the manager 14 moves to block 56 to retrieve the next sheet, and thence to decision diamond 50. Otherwise, the process moves to decision diamond 58 to determine whether the connector number for a symbol under test exists in the portion of the database, referred to herein as "connector page", that pertains to the sheet under test.

If the symbol does not exist, the process loops back to decision diamond 54 to retrieve the next symbol. On the other hand, if, at decision diamond 58, a connector number for symbol being processed is found, the process moves to block 60 to read the database to determine the number of times the symbol under test appears on the sheet under test. As indicated in FIG. 3, the default value for the number of repetitions is one (1).

From block 60 the process moves to decision diamond 62 to determine whether connector data for the symbol being processed, for that connector number, exists in the database for the number of repetitions found at block 60. If it does, the logic proceeds to block 64 to write the data, along with the symbol and the number of repetitions, into a temporary file. The process loops back from block 64 to decision diamond 54 to find the next symbol on the sheet being processed. If desired, the manager 14 can compare the number of connector pins on a particular connector, as recorded in the associated connector page, and compare it with the number of pins shown in the schematic itself, to determine whether the numbers are equal, as they should be.

In contrast, if the connector data for the part under test is not present at decision diamond 62, the logic moves to decision diamond 66 to determine whether default data for the symbol under test exists in the associated database connector page, for a default repetition count of one. If it does, the process moves to block 64, but otherwise loops back to decision diamond 54. It is to be understood that in the event that the test at decision diamond 66 is negative, the present logic generates a message that a symbol exists on a schematic sheet that is not supported in the database, so that the need for corrective action is flagged.

Figure 4:
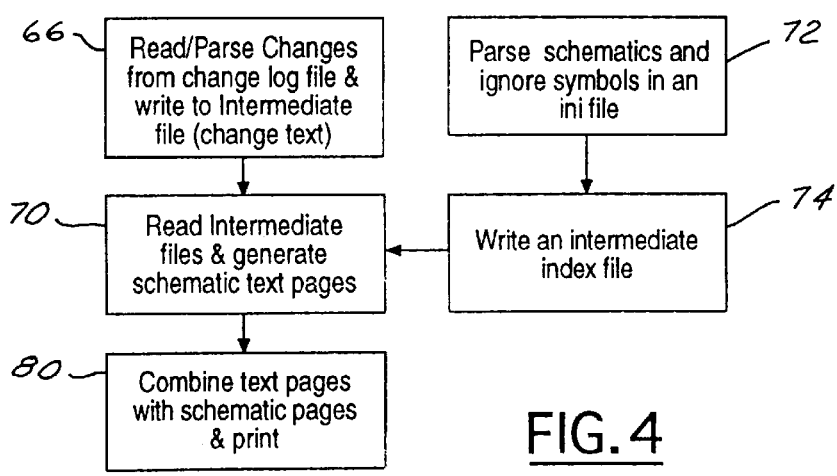
FIG. 4 is a flow chart showing the schematic publication process.

FIG. 4 shows the steps for publishing the schematics processed in FIG. 3. Commencing at block 68, changes are read and parsed from the change file, and the changes are written to an intermediate file. Thus, the intermediate file contains textual changes to the connector pages. Moving to block 70, the intermediate file is read and schematic text pages are generated in response. Accordingly, the output of block 70 is schematic pages with text only, without electrical connectivity.

In parallel with the processes executed at blocks 68 and 70, at block 72 the schematics are parsed, and all symbols that exist in one of the initialization files mentioned above are ignored while making a list of all other symbols in the schematic set, along with their devicd_name property and the sheet upon which they appear. Then, at block 74 an intermediate text file is written, based on the results of block 72, and this file is converted at block 76 to an appropriate format.

At block 80, as indicated in FIG. 4 the text and schematic files generated in FIGS. 3 and 4 above are combined to render the final schematic sheets. Also rendered are accompanying "connector pages", along with accompanying data text pages, i.e., "change pages", and "index pages".

While the particular VEHICLE ELECTRICAL SCHEMATIC MANAGEMENT SYSTEM as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A computer including a data storage device including a computer usable medium having computer usable code means for managing the generation of vehicle electrical schematic diagrams, the computer usable code means having:

computer readable code means for accessing an electronic graphics database of electrical schematics; computer readable code means for accessing an electronic text database of data pertaining to the schematics;

computer readable code means responsive to the means for accessing for determining whether the electronic text database includes information associated with at least one connector symbol in at least one of the schematics; and computer readable code means for publishing a schematic book including a change log, index pages, cover pages, and connector pages.

2. The computer of claim 1, further comprising:

computer readable code means for finding at least one connector symbol on at least one of the schematics; and computer readable code means for determining the number of times the symbol is repeated on the schematic.

3. The computer of claim 2, wherein the means for determining determines whether the text database contains default data for assigning the default data to the symbol, when the text database does not contain data on the symbol.

4. The computer of claim 3, wherein the default data is for only a single repetition of the symbol.

5. The computer of claim 1 wherein the means for publishing comprises:

a computer readable code means for reading the change log and producing an intermediate file which may be included on automatically generated schematic sheets; and a computer readable code means for reading entire schematics, creating an index listing electrical symbols and connector symbols and which page they appear on, and producing an intermediate file which may be included on automatically generated schematic sheets.

6. The computer of claim 5 wherein the change log comprises a plain text file having a time and date stamp, and user change notes.

7. A method for managing the team modification of vehicle electrical schematics, comprising the steps of:

manually editing vehicle schematics to generate edited schematics;

electronically editing vehicle schematics to generate edited schematics, the step of manually editing vehicle schematics taking place in parallel with the step of electronically editing vehicle schematics;

manually editing a database containing data associated with the schematics to generate an edited database;

electronically editing the database containing data associated with the schematics to generate the edited database, the step of manually editing the database taking place in parallel with the step of electronically editing the database;

establishing an intermediate electronic graphics database based on the edited schematics;

establishing an intermediate electronic text database based on the edited database; and combining the electronic databases to generate a set of updated schematics electronically and in hard copy.

8. The method of claim 7, further comprising the steps of:

accessing with a computer the electronic graphics database of electrical schematics electronically and in hard copy;

accessing with a computer the electronic text database;

determining with a computer whether the electronic text database includes information associated with at least one connector symbol in at least one of the schematics; and generating an output representative of each of the schematics.

9. The method of claim 8, further comprising the steps of:

finding at least one electrical symbol on at least one of the schematics; and determining the number of times the symbol is repeated on the schematic.

10. The method of claim 9, wherein the determining step determines whether the text database contains default data for assigning the default data to the symbol, when the text database does not contain data on the symbol.

11. The method of claim 10, wherein the default data is for only a single repetition of the symbol.

* * * * *